(No Model.)
H. ALLEY.
SAW.
No. 307,616. Patented Nov. 4, 1884.
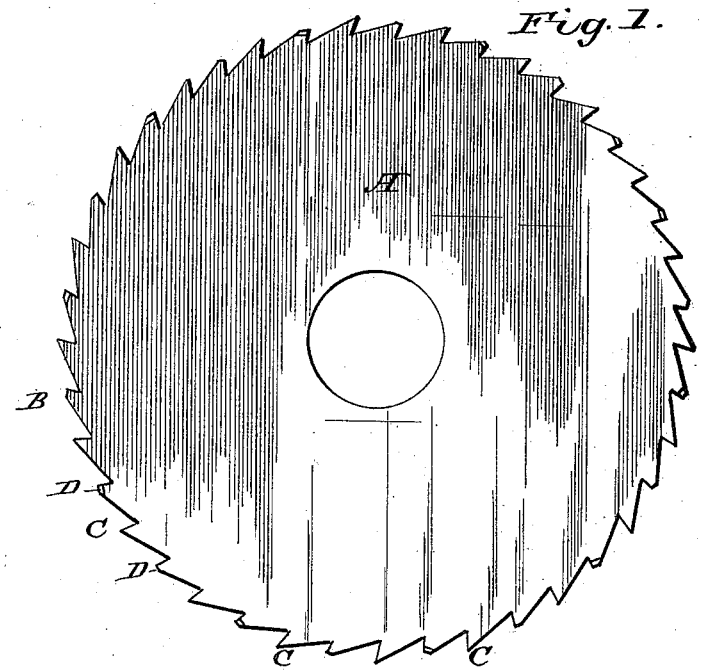
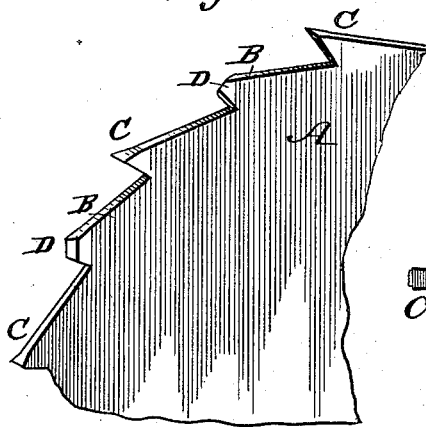
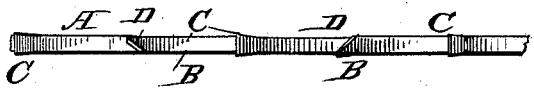
WITNESSES:
Fred. G. Dieterich
Wm. Bagger
Hiram Alley,
INVENTOR,
by Louis Bagger & Co
ATTORNEYS.

UNITED STATES PATENT OFFICE.

HIRAM ALLEY, OF CLIFTY, INDIANA.

SAW.

SPECIFICATION forming part of Letters Patent No. 307,616, dated November 4, 1884.

Application filed September 6, 1884. (No model.)

*To all whom it may concern:*

Be it known that I, HIRAM ALLEY, of Clifty, in the county of Decatur and State of Indiana, have invented certain new and useful Improvements in Planing-Saws; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved planing-saw. Fig. 2 is a perspective view of a portion of the same, and Fig. 3 is a plan view of the portion shown in Fig. 2.

The same letters refer to the same parts in all the figures.

This invention relates to circular and other saws; and it has for its object to so construct the same that the stuff sawed thereby shall present smooth or planed surfaces.

To this end the invention consists in the improved construction of the said saws which will be hereinafter fully described, and particularly pointed out in the claim.

In the drawings hereto annexed, A designates the body of my improved saw, which, in the figures, is illustrated as being a circular saw. Every alternate tooth of the said saw is an ordinary rip-tooth, while the intermediate teeth are constructed with inclined points, inclined in the direction of the draft, and having beveled edges D D, which are beveled alternately in opposite direction. By this construction it will be seen that the points of the ripping-teeth C C are the longest, and serve to cut the fiber of the wood in advance of the planing-teeth B B, the beveled edges of which serve as clearers, and leave the surfaces of the stuff smooth and clean and free from splinters.

This invention is, as will be easily seen, applicable to rip-saws of all kinds, whether circular or otherwise, and to saws having insertible as well as stationary teeth. The device is inexpensive, and it will run with little power and produce good results.

I am aware that it is not new to construct a saw with planing-teeth disposed alternately with the ripping-teeth; but my saw differs from others of the same class in this, that it may be made from a saw of ordinary construction by truncating alternate teeth and beveling the truncated points alternately in opposite directions.

In very heavy saws the planer-teeth may be used with central longitudinal grooves, so as to present cutting-edges on both sides.

Having thus described my invention, I claim and desire to secure by Letters Patent of the United States—

An improved saw having all its teeth of even pitch, with every alternate tooth having its point cut off, and the truncated top beveled alternately in opposite directions, as shown and set forth.

In testimony that I claim the foregoing as my own I have hereunto affixed my signature in presence of two witnesses.

HIRAM ALLEY.

Witnesses:
CERTY EWING,
ANDREW J. SMITH.